(12) United States Patent
Chen et al.

(10) Patent No.: US 11,600,238 B2
(45) Date of Patent: Mar. 7, 2023

(54) DISPLAY DEVICE HAVING DIGITAL MICROMIRROR ARRAY WITH AN INCREASED DISPLAY BIT DEPTH

(71) Applicant: APPOTRONICS CORPORATION LIMITED, Guangdong (CN)

(72) Inventors: Chen Chen, Guangdong (CN); Fei Hu, Guangdong (CN); Xin Yu, Guangdong (CN); Zuqiang Guo, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/601,388

(22) PCT Filed: May 18, 2020

(86) PCT No.: PCT/CN2020/090758
§ 371 (c)(1),
(2) Date: Oct. 4, 2021

(87) PCT Pub. No.: WO2020/238664
PCT Pub. Date: Dec. 3, 2020

(65) Prior Publication Data
US 2022/0189419 A1 Jun. 16, 2022

(30) Foreign Application Priority Data
May 30, 2019 (CN) .......................... 201910463255.4

(51) Int. Cl.
*G09G 3/34* (2006.01)

(52) U.S. Cl.
CPC ..... *G09G 3/346* (2013.01); *G09G 2320/0233* (2013.01); *G09G 2320/0626* (2013.01)

(58) Field of Classification Search
CPC .......... G09G 3/346; G09G 2320/0233; G09G 2320/0626; G09G 3/34; G09G 5/06;
(Continued)

(56) References Cited

U.S. PATENT DOCUMENTS

| | | | | |
|---|---|---|---|---|
| 5,461,411 A | * | 10/1995 | Florence | ............ H04N 1/40031 347/240 |
| 2002/0118375 A1 | * | 8/2002 | Ramanujan | .............. B41J 2/465 358/1.2 |

(Continued)

FOREIGN PATENT DOCUMENTS

| CN | 105991980 A | 10/2016 |
|---|---|---|
| CN | 106205451 A | 12/2016 |
| CN | 108538265 A | 9/2018 |

OTHER PUBLICATIONS

International Search Report in International Application No. PCT/CN2020/090758 dated Aug. 4, 2020.

*Primary Examiner* — Richard J Hong
(74) *Attorney, Agent, or Firm* — Knobbe, Martens, Olson & Bear LLP

(57) ABSTRACT

A display device includes a light source, a light modulator, and a control apparatus, the light modulator includes a digital micromirror array including micromirrors and is arranged on a light path of light emitted by the light source and configured to modulate the light emitted by the light source based on a target image and luminance of the light source to obtain a grayscale image. The control apparatus is configured to control a driving current of the light source to adjust the luminance of the light source in different periods within a frame image, and to cause a driving current overdrive pulse of the light source during at least one of the periods, so that a display bit depth of the grayscale image increases from n to n+i and the periods correspond to (Continued)

bitplanes of the grayscale image in one-to-one correspondence, $i \geq 1$ and i is an integer.

14 Claims, 14 Drawing Sheets

(58) Field of Classification Search
CPC .... H04N 9/3126; H04N 5/7458; H04N 1/407; H04N 1/40031; G02B 27/1026; G02B 27/283; B41J 2/465
See application file for complete search history.

(56) References Cited

U.S. PATENT DOCUMENTS

| | | | |
|---|---|---|---|
| 2003/0020725 A1* | 1/2003 | Matsuda | H04N 1/407 345/600 |
| 2003/0035123 A1* | 2/2003 | Ramanujan | G02B 27/283 358/1.4 |
| 2003/0147053 A1* | 8/2003 | Matsuda | G09G 5/06 348/E5.074 |
| 2004/0145793 A1* | 7/2004 | Barbour | G09G 3/34 359/242 |
| 2006/0181653 A1* | 8/2006 | Morgan | H04N 5/7458 348/E5.142 |
| 2009/0135315 A1* | 5/2009 | Endo | G02B 27/1026 348/771 |
| 2014/0327885 A1* | 11/2014 | Mansur | H04N 9/3126 353/30 |

* cited by examiner

S11

When Displaying i Bitplanes of n+i Bitplanes, Setting Each of the i Bitplanes to Include Only One Least Significant Bit, and Adjusting a Driving Current of a Light Source to Match the Luminance of the Light Source with i Values of k in a Set $\{k|k=2^{j}L, 0 \leq j \leq i-1, j \in Z\}$ in One-to-one Correspondence, where the Grayscale Image Includes the n+i Bitplanes, and L Denotes a Preset Brightness Parameter ~ S111

When Displaying the Remaining n Bitplanes of the n+i Bitplanes, Matching Numbers of Least Significant Bits in the Remaining n Bitplanes with n Values of m in a Set $\{m|m=2^{j-i}, i \leq j \leq n+i-1, j \in Z\}$ in One-to-one Correspondence, and Adjusting the Driving Current of the Light Source to Make the Luminance of the Light Source be $2^{i}L$ ~ S112

FIG. 5

DISPLAY DEVICE HAVING DIGITAL MICROMIRROR ARRAY WITH AN INCREASED DISPLAY BIT DEPTH

TECHNICAL FIELD

The present disclosure relates to the field of display technology, and in particular, to a display device.

BACKGROUND

When displaying an image based on a digital micromirror array (such as Digital Micromirror Device (DMD)), a display bit depth of the image is related to crossover time and switching time of the DMD. The crossover time generally lasts for 1 to 3 microseconds and is the time required for the micromirror to crossover from one state to another state. The switching time generally lasts for more than 10 microseconds and is the time required for a single micromirror to continuously change from one state to another state. The time that the switching time lasts except the crossover time is stable dithering time for the micromirror. In theory, the switching time determines the number of crossovers of a single micromirror within a frame image, and therefore also determines the display bit depth of the image.

Commonly used methods for achieving a high bit depth in the prior art mainly include DMD clear operation, DMD dithering, and light intensity modulating of the light source.

The clear operation can make all micromirrors return to an "off" state without waiting for the stable dithering time. Therefore, the clear operation can shorten the switching time to the crossover time, thereby increasing the display bit depth of the image. However, as the time that the mirror is effectively in an "on" state will decrease, the maximum average brightness of the image for displaying decreases, and the more the bit depth is increased, the more the average brightness of the image for displaying will decrease.

The DMD dithering can be divided into space dithering and time dithering. For example, if only half of the spatially adjacent pixels are bright during one display period, as shown in FIG. 1, among the four adjacent pixels numbered 1, 2, 3, and 4, the pixel 1 and the pixel 4 are bright, or the pixel 2 and pixel 3 are bright, then when the pixels are small enough or the human eye is far enough from the screen, the average brightness of the four pixels visible by the human eyes is half of the minimum brightness that a single pixel can display. In addition, time dithering can be further used to allow the DMD adjacent pixels to display in turn, for example, to allow the above four pixels to respectively display in turn within four image frames, so as to achieve a smaller brightness unit as well as avoid a repeated pattern on the display screen. The DMD dithering increases the bit depth by decreasing the minimum brightness unit of the image for displaying, while also decreasing the maximum average brightness of the image for displaying.

The principle of the light intensity modulating of the light source is to decrease the light intensity of the light source within the time corresponding to the least significant bit (LSB), so as to achieve a lower grayscale display. For example, during the time corresponding to LSB, if the light intensity of the light source is adjusted to 1/16 of the original light intensity, then the brightness corresponding to LSB becomes 1/16 of the original brightness, and the display bit depth of the image increases by 4 bits. The light intensity modulating of the light source also reduces the maximum average brightness of the image display to increase the image display bit depth.

To sum up, in the prior art, the high bit depth is achieved by decreasing the minimum brightness, so that the details of the dark part of the image to be displayed can be displayed, however, all of these methods lead to a decreasing maximum average brightness of the image display, and if ambient light in an environment where the projection system is disposed has a high brightness, the increased gray-scale details in the low-brightness interval will be concealed by the ambient light.

SUMMARY

The present disclosure provides a display device, which can solve the problem in the prior art that the display bit depth of the display device is limited and the maximum average display brightness decreases within one frame.

In a technical scheme of the present disclosure, a light source, a light modulator, and a control apparatus are provided. The light modulator includes a digital micromirror array including a plurality of micromirrors, and is arranged on a light path of light emitted by the light source and configured to modulate the light emitted by the light source based on a target image and luminance of the light source to obtain a grayscale image. The control apparatus is configured to control a driving current of the light source to adjust the luminance of the light source in different periods within a frame image, and to cause a driving current overdrive pulse of the light source during at least one of the periods, so that a display bit depth of the grayscale image increases from n to n+i (i≥1 and i is an integer), and the periods correspond to bitplanes of the grayscale image in one-to-one correspondence.

The display device provided by the present disclosure uses the method of the overdrive pulse of the current of the light source to increase the peak brightness of the display device to increase the display bit depth, meanwhile, this method can increase the maximum average display brightness and shorten the display time of a single frame image. The display device provided by the present disclosure also comprehensively takes the bit depth, the brightness and the service life into account. The display device provided by the present disclosure also optimizes the time control of the bitplanes, so that the bitplanes and its corresponding display brightness can be more evenly distributed within one frame time, which can avoid the flicker when displaying images.

BRIEF DESCRIPTION OF DRAWINGS

In order to more clearly describe the technical schemes of the embodiments/implementations of the present disclosure, the following will briefly introduce the accompanying drawings that are needed in the description of the embodiments/implementation manners. Obviously, the accompanying drawings in the following description are merely some embodiments/implementations of the present disclosure, and for those skilled in the art, other drawings can be obtained without creative efforts based on these accompanying drawings.

FIG. 4 to FIG. 7 are modulation flow charts of a light source and a light modulator according to the first embodiment of the present disclosure.

Figure 1:
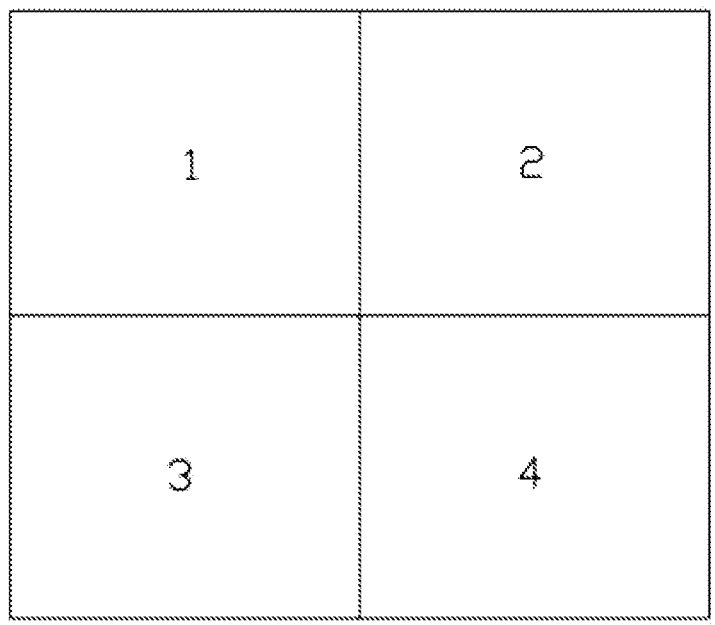
FIG. 1 is a schematic diagram illustrating an arrangement of pixels numbered 1 to 4.

| Explanation of symbols for main components | |
|---|---|
| Steps | S11, S12, S111, S112, S21, S22, S23, S24, S221, S222, S223, S224, S31, S32, S33, S34 |

The following specific embodiments will further illustrate the present disclosure in combination with the above accompanying drawings.

DESCRIPTION OF EMBODIMENTS

In order to more clearly illustrate the objectives, features and advantages of the present disclosure, the present disclosure will be described in detail in the following with reference to the accompanying drawings and specific embodiments. It should be noted that the embodiments of the present application and the features in the embodiments can be combined with each other if there is no conflict therebetween.

In the following description, many specific details are set forth in order to clearly illustrate the present disclosure, and the described embodiments are merely some embodiments of the present disclosure, rather than all the embodiments. Based on the embodiments of the present disclosure, all other embodiments obtained by those skilled in the art without creative efforts shall fall within a protection scope of the present disclosure.

Unless otherwise defined, all technical and scientific terms used herein have the same meaning as commonly understood by those skilled in the technical field of the present disclosure. The terms used in the description of the present disclosure herein are only for a purpose of describing specific embodiments, and are not intended to limit the present disclosure.

The current overdrive pulse of the light source is applied in the display device provided by the present disclosure to increase the peak brightness of the display device to increase the display bit depth, meanwhile, this method can increase the maximum average display brightness and shorten the display time of a single frame image. The display device provided by the present disclosure also comprehensively takes the bit depth, the brightness and the service life into account. The display device provided by the present disclosure also optimizes the time control of the bitplanes, so that the bitplanes and their corresponding display brightness can be more evenly distributed within one frame time, which can avoid the flicker when displaying images. The display device provided by the present disclosure can be, for example, a theater projector, an engineering projector, a micro projector, a laser television, and other display products.

First Embodiment

The first embodiment of the present disclosure provides a display device 10. The display device 10 includes a light source, a light modulator, and a control apparatus. The light modulator includes a digital micromirror array including a plurality of micromirrors, is arranged on a light path of light emitted by the light source, and is configured to modulate the light emitted by the light source based on a target image and luminance of the light source to obtain a grayscale image. The control apparatus is configured to control a driving current of the light source, so that the luminance of the light source can be adjusted in different periods within a frame image, and a driving current overdrive pulse of the light source occurs during at least one of the periods, thereby increasing a display bit depth of the grayscale image from n to n+i (i≥1 and i is an integer), and each period is in a one-to-one correspondence to a bitplane of the grayscale image.

In this embodiment, the light source includes a plurality of lasers, which emit laser light as illuminating light. In other embodiments, the light source can also be a light emitting diode. Specifically, a current overdrive pulse refers to increase the luminance of the laser utilizing an overdrive pulse current, in which the driving current exceeds a rated current of the laser. The rated current refers to a maximum current that allows the laser to work stably for a long time.

The light modulator includes a digital micromirror array including a plurality of micromirrors. The micromirror are provided with different angles to control reflection directions of incident light. Generally, an "on" state of the micromirror corresponds to modulating the light emitted by the light source to form image light to be projected to the display device; and an "off" state of the micromirror corresponds to reflecting the light emitted by the light source to an area deviated from the display device, and at this time, the light emitted by the light source is non-image light.

In addition, it is known that the reason why a computer can display colors is that the computer records the data representing colors using a counting unit called "bit". For an image with a display bit depth of 8 bits, the maximum grayscale value is $2^8$, i.e., 256. For an image, a grayscale value of which is represented by bit, each bit can be regarded as representing a binary plane, which is also referred to as a bitplane. Each bitplane includes one or more least significant bits, so a time length corresponding to the bitplane is a time length corresponding to the total number of the least significant bits of the bitplane. The least significant bit is a common concept in the micromirror, and refers to the smallest grayscale unit that can be realized by the micromirror. For example, assuming that the display area corresponding to the micromirror can achieve $2^8$, i.e., 256 grayscale states, in addition to the absolutely dark state

[00000000], [00000001] is the smallest brightness unit that can be modulated and is also a grayscale difference between two adjacent grayscales. In order to achieve this brightness, the time length in which the micromirror is in an "on" state is the time length corresponding to the least significant bit.

Specifically, referring to FIG. 3 to FIG. 7, FIG. 3 is a schematic diagram illustrating a modulation method for a light source and a light modulator according to a first embodiment of the present disclosure, and FIG. 4 to FIG. 7 are modulation flow charts of the light source and the light modulator according to the first embodiment of the present disclosure.

At step S11, the control apparatus is configured to control a driving current of the light source, so that the luminance of the light source during the time of one frame image is adjusted in different periods, and a driving current overdrive pulse occurs during at least one of the periods. The step S11 includes the following steps.

At step S111, the grayscale image includes n+i bitplanes, when displaying i bitplanes, each bitplane includes only one least significant bit, and the driving current of the light source is adjusted in such a manner that the luminance of the light source is in a one-to-one correspondence to i values of k in the set $\{k|k=2^j L, 0 \leq j \leq i-1, j \in Z\}$, where L denotes a preset brightness parameter.

At step S112, when displaying the remaining n bitplanes, the numbers of least significant bits of each bitplane are in one-to-one correspondence to n values of m in the set $\{m|m=2^{j-i}, i \leq j \leq n+i-1, j \in Z\}$, and the driving current of the light source is adjusted in such a manner that the luminance of the light source is $2^i L$.

For example, if an original display bit depth n of the display device is 5 and the number i of the bit depth that needs to be increased is 3, then the display bit depth of the grayscale image is increased from 5 bits to 8 bits, and the number of bitplanes is also increased from 5 to 8. Since each period corresponds to image data of one bitplane of the grayscale image, the control apparatus divides the luminance of the laser into 8 portions for adjustment. When displaying three bitplanes, each of the three bitplanes includes one least significant bit, and the corresponding luminance of the laser is L, 2 L, and 4 L, respectively; when displaying the remaining five bitplanes, the remaining five bitplanes include one, two, and four, eight, and sixteen least significant bits, respectively, and the corresponding luminance of the laser is 8 L.

At step S12, the light modulator is configured to modulate the light emitted by the light source based on the target image and the luminance of the light source. The step S12 includes: when displaying any one bitplane of the n+i bitplanes, the modulation duration of the light modulator matches with the number of least significant bits of the bitplane, where the grayscale image includes n+i bitplanes.

For example, if the original display bit depth n of the display device is 5 and the bit depth I that needs to be increased is 3, then the display bit depth of the grayscale image is increased from 5 bits to 8 bits, and the number of bitplanes is also increased from 5 to 8. Since each period corresponds to image data of one bitplane of the grayscale image, the control apparatus divides the luminance of the laser into 8 portions for adjustment. When displaying three bitplanes, each of these three bitplanes includes one least significant bit, and the corresponding luminance of the laser is respectively L, 2 L, and 4 L. In this case, if the display luminance is L, the micromirror is controlled to be in the states "on", "off", and "off" when displaying the three bitplanes. The modulation duration of the micromirror is the duration of one least significant bit; when displaying the remaining five bitplanes, the remaining bitplanes respectively includes one, two, four, eight, and sixteen least significant bits, and the corresponding luminance of the laser is 8 L. If the display luminance is 32 L, the micromirror is controlled to be in the states "off", "off", "on", "off", and "off" when displaying the five bitplanes, that is, the state of the micromirror is always "on" within four least significant bit duration of the bitplane.

Figure 3:
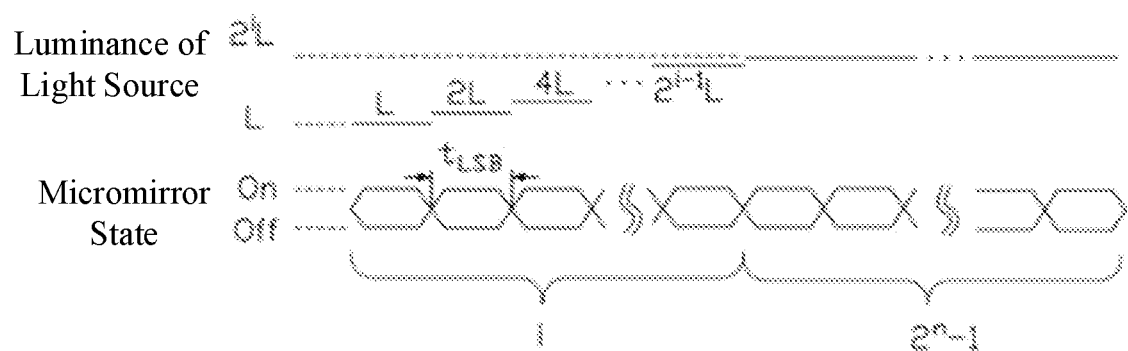
FIG. 3 is a schematic diagram illustrating a modulation method of a light source and a light modulator according to a first embodiment of the present disclosure.
Figure 4:
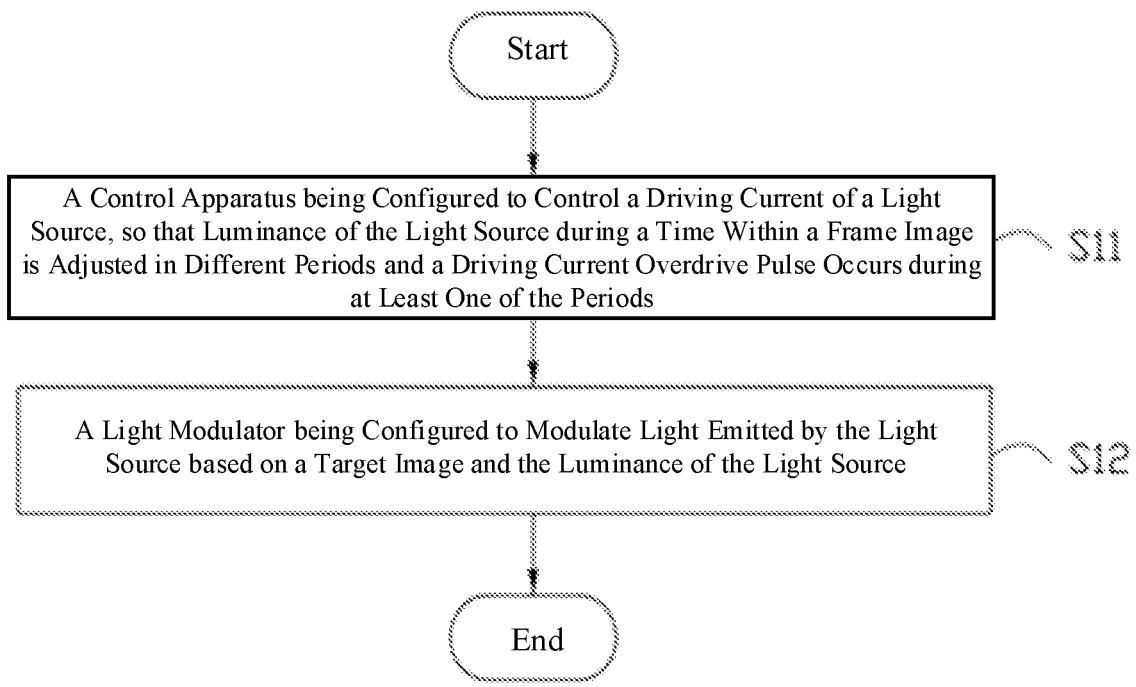

It should be understood that FIG. 3 is merely a special case of the first embodiment of the present disclosure. The present disclosure does not limit the arrangement of the bitplanes.

Through the cooperation of the light source and the light modulator, the set of the grayscale values can be $\{0, 1, 2, 3, \ldots, 2^{n+i}-1\}L$. A case where all micromirrors are in "off" states corresponds to a case where the grayscale values of the pixels are 0, and a case where all micromirrors are in "on" states corresponds to a case where the grayscale values of the pixels are $(1+2^1+2^2+\ldots+2^{i-1})L+(2^n-1)2^i L=(2^{n+i}-1)L$.

In this embodiment, the current overdrive pulse is used to increase the peak brightness of the display device, so as to increase the display bit depth. On the other hand, the time required to achieve n+i bit display in the continuous rated current driving state is $(2^{n+i}-1)t_{LSB}$, where $t_{LSB}$ denotes the duration of displaying a single least significant bit. The display device provided by the embodiment of the present disclosure requires a duration of $(2^n+i-1)t_{LSB}$ for achieving n+i bit display, and the required time is approximately $\frac{1}{2^i}$ times a duration of the continuous rated current driving state. Therefore, the display device provided by the embodiment of the present disclosure is beneficial to shorten the display time of a single frame. The beneficial effects of shortening the display time of a single frame are as follows: high frame rate can be achieved, and more intermediate states of the image can be seen in a same period to make the moving images smoother and more natural; further, in a system including a single display chip or double display chips, the high frame rate indicates that different color wheels can be turned faster, so a rainbow phenomenon can be greatly alleviated; in addition, since the display time of a single frame is shortened, the time originally for displaying the single frame can be used to display the images with different viewing angles, thereby achieving a 3D light field.

In addition, compared with the traditional method in which the minimum display brightness is decreased to increase the display bit depth, in this embodiment, the maximum average display brightness of the displaying image that can be achieved within one frame time is:

$$L_{mean} = \frac{(1+2^1+2^2+\cdots+2^{i-1})L+(2^n-1)2^i L}{i+2^n-1} = \frac{2^{n+i}-1}{2^n+i-1}L \approx 2^i L > L.$$

It can be seen that the luminance of the laser in this embodiment is $2^i$ times that in the continuous rated current driving state, thereby being beneficial to increase the maximum average display brightness of the display device.

As the value of the increased bit depth i increases, the time for which the current overdrive pulse of the laser lasts also increases, and the service life of the laser can be affected to a certain extent. Therefore, when considering the application, the increase of the bit depths, the increase of brightness, and the influence on service life need to be comprehensively taken into consideration, so that the value of the increased bit depth i is further determined. Specifically, with reference to FIG. 6, the control apparatus provided by this present disclosure is further configured to determine whether the increased bit depth meets the preset service life of the light source, and this step includes following steps.

At step S21, an initial value is assigned to the increased bit depth number i.

At step S22, an aging acceleration factor $\pi$ of the light source in a current overdrive pulse state is calculated based on the increased bit depth i and the rated current $I_{norm}$ of the light source, a rated output $P_{norm}$ of the light source, and the working temperature $T_{norm}$ of the light source in the continuous rated current driving state.

Figure 7:
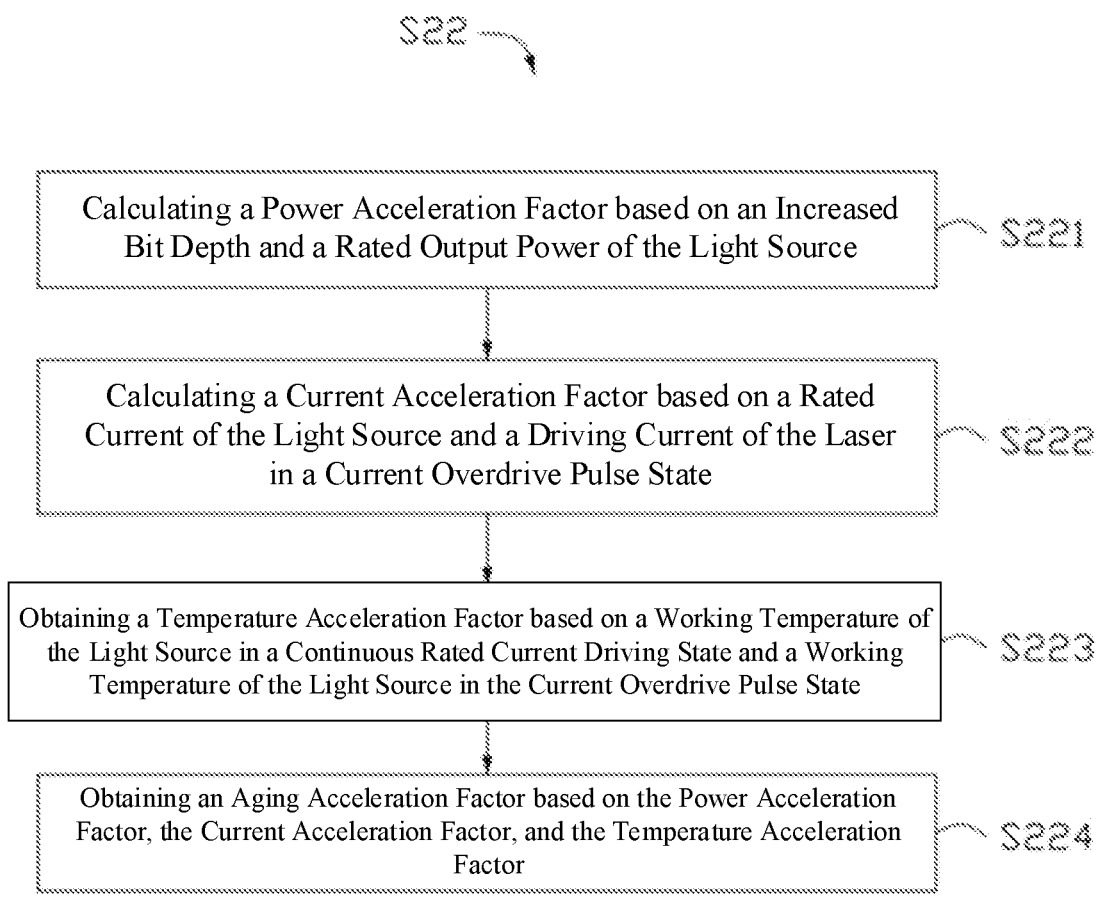

Specifically, for a long pulse on the order of milliseconds, the influence on the service life of the laser by using N times (about 5 times) the rated driving current mainly results from gradual aging. It should be noted that the limitation of a driving under the current overdrive pulse mainly lies in heat dissipation of the laser. While keeping the junction temperature of the laser lower than the maximum working temperature, if a thermal resistance between the laser and a heat sink is halved, theoretically N can be larger. Compared with the continuous rated current driving state, the aging acceleration state has an aging acceleration factor 1 L, that is, under the aging acceleration condition, the statistical service life of the laser is approximately $1/\pi$ that in the continuous rated current driving state. In general, the aging acceleration factor $\pi$ will be affected by the working temperature of the laser (the temperature of the light-emitting cavity) $T_{LD}$, the output power $P_{LD}$ of the laser, and the driving current $\pi_T$ of the laser, that is, $\pi=\pi(T_{LD}, P_{LD}, I_{LD})$. $\pi(T_{LD}, P_{LD}, I_{LD})$ can be expressed as the product of a temperature acceleration factor $\pi_T$, a power acceleration factor $\pi_p$ and a current acceleration factor $\pi_I$, that is, $\pi=\pi(T_{LD}, P_{LD}, I_{LD})=\pi_T\pi_p\pi_I$. With reference to FIG. 7, the step S22 further includes step S221, step S222, and step S223.

At step S221, the power acceleration factor $\pi_p$ is calculated based on the increased bit depth i and the rated output power $P_{norm}$ of the light source.

Specifically, based on the increased bit depth i and the rated output power $P_{norm}$ of the laser, the output power $P_{LD}$ of the laser in the current overdrive pulse state can be calculated. In this embodiment, $P_{LD}=2^i P_{norm}$. Based on the output power $P_{norm}$ of the laser in the continuous rated current driving state and the output power $P_{LD}$ of the laser in the current overdrive pulse state, the power acceleration factor $\pi_p$ can be calculated. In this embodiment, $$\pi_P = \left(\frac{P_{LD}}{P_{norm}}\right)^\beta,$$

where $\beta$ represents a derating exponent, which is related to a material of the laser.

At step S222, the current acceleration factor $\pi_I$ is calculated based on the rated current $I_{norm}$ of the light source and the driving current $I_{LD}$ of the laser in the current overdrive pulse state.

In this embodiment, $$\pi_I = \left(\frac{I_{LD}}{I_{norm}}\right)^x.$$

Since the driving current of the laser is directly related to the output power and the temperature of the laser, the value of x is generally 0, and thus the value of $\pi_I$ is generally 1. In an embodiment, the step S222 can be omitted to reduce the calculated amount, and the current acceleration factor $\pi_I$ is directly assigned with a value of 1.

At step S223, the temperature acceleration factor $\pi_T$ is obtained based on the working temperature $T_{norm}$ of the light source in the continuous rated current driving state and the working temperature $T_{LD}$ of the light source in the current overdrive pulse state.

Specifically, the temperature acceleration factor $\pi_T$ can be calculated based on $$\pi_T(T_{LD}) = \exp\left[-\frac{E_A}{k_B}\left(\frac{1}{T_{LD}} - \frac{1}{T_{norm}}\right)\right],$$

where $E_A$ represents a thermal activation energy, a value of which generally ranges from 0.2 eV to 0.7 eV, and $k_B$ represents a Boltzmann's constant.

At step S224, the aging acceleration factor $\pi=\pi(T_{LD}, P_{LD}, I_{LD})=\pi_T\pi_p\pi_I$ is obtained based on the power acceleration factor $\pi_T$, the current acceleration factor $\pi_I$, and the temperature acceleration factor $\pi_p$.

Figure 6:
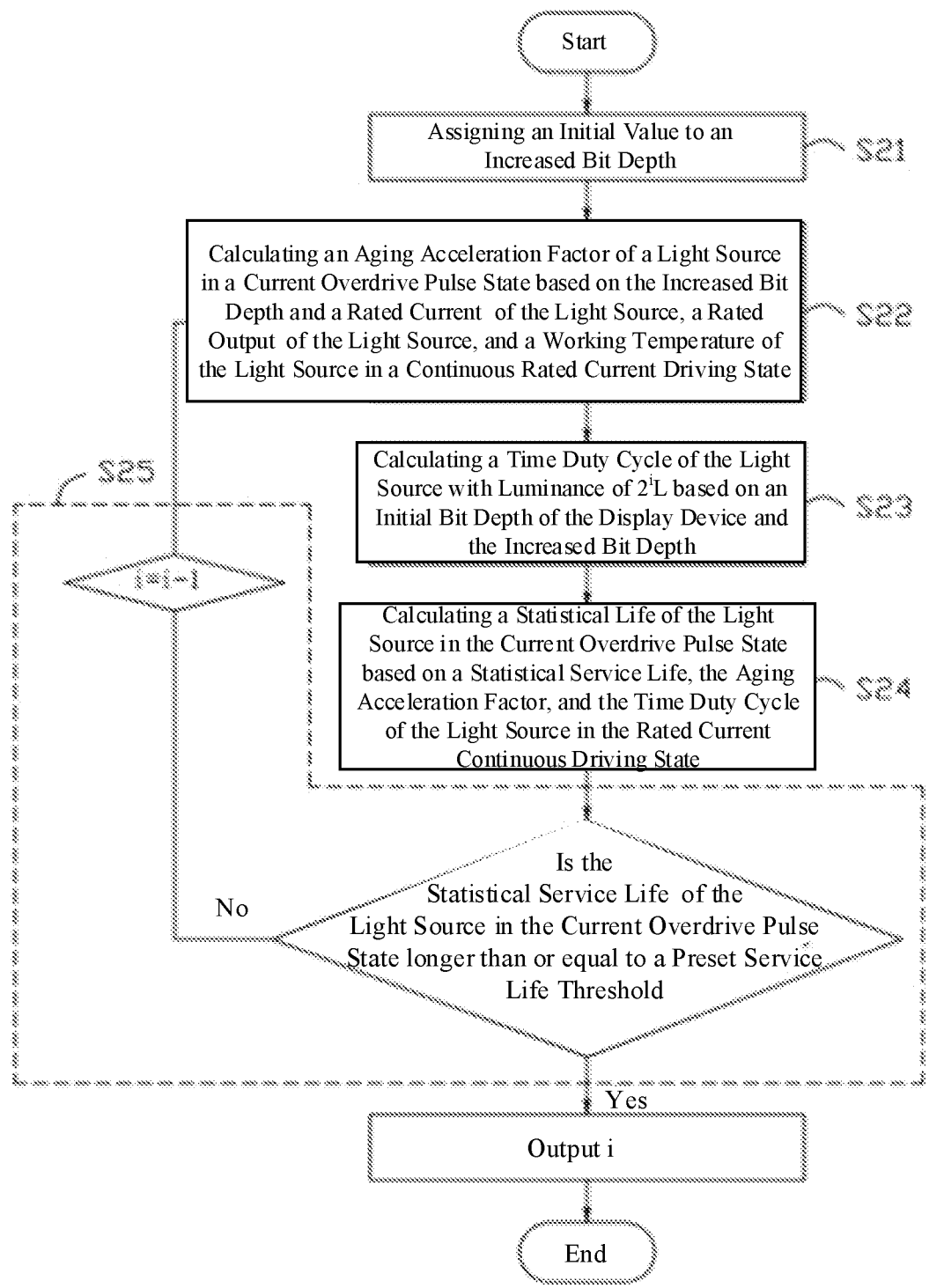

At step S23, with further reference to FIG. 6, a time duty cycle of the light source with luminance of $2^i L$ is calculated based on the initial bit depth n of the display device and the increased bit depth i.

In this embodiment, the time duty cycle of the light source with luminance of $2^i L$ is $$D_{on} == \frac{2^n - 1}{i + 2^n - 1}.$$

At step S24, a statistical life $\lambda_{LD}$ of the light source in the current overdrive pulse state is calculated based on the statistical service life $\lambda_{norm}$, the aging acceleration factor $\pi$, and the time duty cycle $D_{on}$ of the light source in the continuous rated current driving state.

At step S25, it is determined whether the statistical service life $\lambda_{LD}$ of the light source in the current overdrive pulse state is longer than or equal to a preset service life threshold.

If the statistical service life $\lambda_{LD}$ of the light source in the current overdrive pulse state is longer than or equal to the preset service life threshold, the currently increased bit depth i is outputted; and if the statistical service life $\lambda_{LD}$ of the light source in the current overdrive pulse state is shorter than the preset service life threshold, i=i−1, that is, the increased bit depth i is decreased by one, then step S22 to step S25 are repeated until the statistical service life $\lambda_{LD}$ of the laser in the current overdrive pulse state is longer than or equal to the preset service life threshold.

In order to further illustrate the above steps, an example is taken in the following to describe the details.

Assuming that under normal rated current lighting conditions, eight (n=8)-digit display can be achieved by controlling the light modulator, the statistical service life of the laser in the continuous rated current driving state is 30000 hours, now it needs to use the method of the current overdrive pulse of the laser to increase the display bit depth as much as possible, and the required product service life (preset service life threshold) is not shorter than 5000 hours.

Now considering that the display bit depth of the display device increases from n bits to n+2 bits, that is, the increased bit depth i is equal to 2, then it is initially considered that the driving current $I_{LD}$ in the current overdrive pulse state of the laser can increase so that the output power $P_{LD}$ of the laser becomes $2^i=2^2=4$ times the output power $P_{norm}$ of the laser in the continuous rated current driving state. Assuming the reduction index β is equal to 2, then the power acceleration factor $\pi_p$ can be calculated as $$\pi_P = \left(\frac{P_{LD}}{P_{norm}}\right)^\beta = 16.$$

On the other hand, due to the thermal resistance between a heat dissipation substrates of the laser, the increase in output power will lead to an increase in heat generation, which in turn causes the temperature of the laser to change from the working temperature $T_{norm}=273+35=308K$ in the continuous rated current driving state to $T_{LD}=273+55=328$ K. Assuming that the thermal activation energy being $E_A=0.3$ eV, then the temperature acceleration factor is $$\pi_T(T_{LD}) = \exp\left[-\frac{E_A}{k_B}\left(\frac{1}{T_{LD}} - \frac{1}{T_{norm}}\right)\right] = \exp(0.6892) \approx 2,$$

therefore, the aging acceleration factor $\pi=\pi(T_{LD}, P_{LD}, I_{LD})=\pi_T\pi_P\pi_I=2\times16\times1=32$.

Since n=8 and i=2, the time duty cycle will be $$D_{on} = \frac{2^8 - 1}{2 + 2^8 - 1} = 0.9922$$

when the luminance of the light source is $2^i L$, then statistical service life of the laser in the current overdrive pulse state will be $$\lambda_{LD} = \frac{3000}{32 \times 0.9922} = 944.87 \ h < 5000 \ h,$$

therefore, the current overdrive pulse will make the statistical service life of the laser shorter than the required product service life (preset service life threshold).

In order to increase the statistical service life $\lambda_{LD}$ of the laser in the current overdrive pulse state, the increased bit depth is reduced by one bit, that is, i=1, and the driving current $I_{LD}$ of the laser in the current overdrive pulse state is increased to make the output power of the laser become $2^1=2$ times the rated output power of the laser in the continuous rated current driving state, then the power acceleration factor will be $$\pi_P = \left(\frac{P_{LD}}{P_{norm}}\right)^\beta = 4.$$

The working temperature of the laser is increased from the temperature $T_{norm}=273+35=308K$ in the continuous rated current driving state to $T_{LD}=273+45=318$ K, then the temperature acceleration factor will be $$\pi_T(T_{LD}) = \exp\left[-\frac{E_A}{k_B}\left(\frac{1}{T_{LD}} - \frac{1}{T_{norm}}\right)\right] = \exp(0.3555) \approx 1.43,$$

the aging acceleration factor will be $\pi=\pi(T_{LD}, P_{LD}, I_{LD})=\pi_T\pi_P\pi_I=1.43\times4\times1=5.72$, the time duty cycle in the current overdrive pulse state will be $$D_{on} = \frac{2^8 - 1}{1 + 2^8 - 1} = 0.9961,$$

and the statistical service life of the laser in the current overdrive pulse state will be $$\frac{30000}{5.72 \times 0.9961} = 5265 \ h > 5000 \ h.$$

Therefore, the display bit depth 8+1=9 can be achieved through the current overdrive pulse, and the laser can have a service life longer than 5000 h. The examples are merely for illustration, and increased bit depth will not be limited herein by the present disclosure.

Second Embodiment

Since the display device provided by the first embodiment of the present disclosure adjusts the luminance of the laser in multiple steps, for example, the luminance of the laser is adjusted to L at the time of the first LSB, the luminance of the laser is adjusted to 2 L at the time of the second LSB, and the luminance of the laser is adjusted to 4 L at the time of the third LSB . . . , the laser performs a variety of luminance adjustments in a short time, and the current-luminance response curve of the laser can drift during operation due to environmental factors such as temperature, resulting in unstable display luminance of the laser. In the second embodiment of the present disclosure, fewer luminance states (such as L and 4 L display states) are used in one frame time without frequently adjusting the luminance of the laser in a short time, and this method is more conducive to stability of the luminance of the laser.

A main difference between the display device provided by the second embodiment of the present disclosure and the display device provided by the first embodiment lies in that, the luminance of the laser in the second embodiment includes only two digital states (L and 2¹L).

Figure 8:
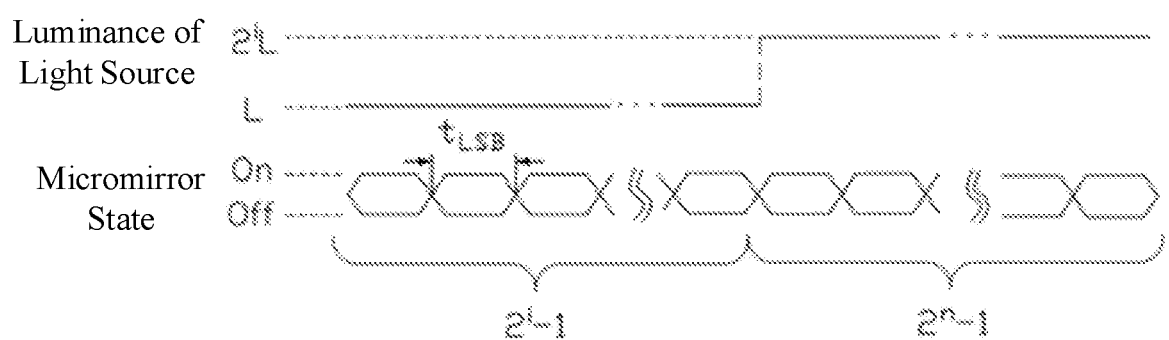
FIG. 8 is a schematic diagram illustrating a modulation method for a light source and a light modulator according to a second embodiment of the present disclosure.

FIG. 8 is a schematic diagram illustrating a modulation method for a light source and a light modulator according to the second embodiment of the present disclosure. With reference to FIG. 8, compared with the first embodiment, the control apparatus adjusting the luminance of the light source in different periods within one frame image time, and causing the driving current overdrive pulse of the light source during at least one of the periods, includes: the following steps: the grayscale image includes n+i bitplanes, the number of least significant bits of each bitplane matches with the i values of x in the set $\{x|x=2^j, 0 \leq j \leq i-1, j \ \varepsilon \ Z\}$ in one-to-one correspondence when displaying i bitplanes, the driving current of the light source is adjusted to make the luminance of the light source be L, where L is the preset brightness parameter; and when displaying the remaining n bitplanes, the numbers of least significant bits included in each bitplane matches with the n values of y in the set $\{y|y=2^{j-i}, j \leq n+i-1, j \ \varepsilon \ Z\}$ in one-to-one correspondence, the driving current of the light source is adjusted to make the luminance of the light source be $2^i L$.

The light modulator being configured to modulate the light emitted by the light source based on the target image and the luminance of the light source, includes the following steps: the grayscale image includes n+i bitplanes, and when displaying any one of the n+i bitplanes, the modulation duration of the light modulator matches with the number of least significant bits of this bitplane.

In this embodiment, the maximum average display brightness of the displaying image that can be achieved within one frame time is:

$$L_{mean} = \frac{(2^i-1)L + (2^n-1)2^i L}{2^i - 1 + 2^n - 1} = \frac{2^{n+i} - 1}{2^n + 2^i - 2} L > L.$$

That is, in this embodiment, the maximum average display brightness of the laser in this embodiment is higher than the maximum average display brightness of the laser in the continuous rated current driving state, and the time to complete the $2^{n+i}$ bits grayscale display is also reduced from the $(2^{n+i}-1)t_{LSB}$ to $(2^n+2^i-2)t_{LSB}$, which also shortens a single frame display time.

In addition, in a case where the luminance of the light source is $2^i L$, the time duty cycle is $D_{on}=(2^n-1)/(2^i-1+2^n-1)$.

It should be understood that the modulation method of the light source and the light modulator shown in FIG. 8 is merely an example of the second embodiment of the present disclosure, and the bitplane arrangement is not limited herein by present disclosure.

Third Embodiment

If the micromirror of the DMD is in an "off" state for a long time in a certain period, the human eye will not receive light for a long time interval, which will result in flickering of the displaying image, for example, for adjacent two image frames, when the pixel displays two grayscale values [10000] and [01111] in turn, "0" in a second half of a previous frame and "0" in a first half of a next frame are connected together in time to occupy the time required for displaying the entire frame, and when, an obvious flickering will be observed by the human eye on the displaying image, and in fact, the grayscales of the two frames differ by only one LSB.

Figure 2:
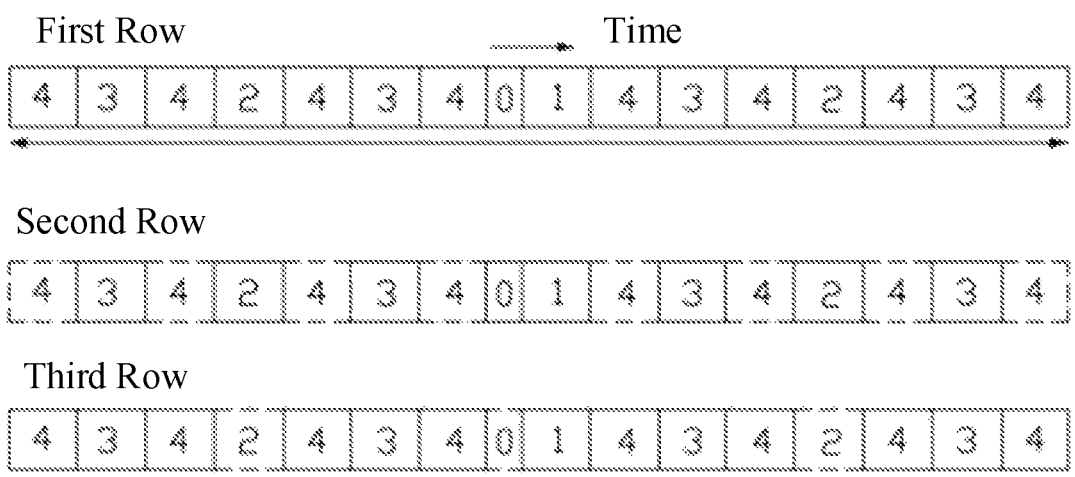
FIG. 2 is a schematic diagram of a principle of bit splitting.

Therefore, in view of the above flickering, an optimized bit split algorithm is to split the least significant bit of each bitplane into several small time segments, which are evenly distributed to one frame time, for example, a first row of sequence shown in FIG. 2 includes five bitplanes in the image display with a bit depth of 5, and the five bitplanes are sequentially numbered as 0, 1, 2, 3, 4 in the figure. Bitplane 0 only displays the time of one least significant bit in time, and the remaining bitplanes display the time of at least 2 LSBs. Considering the load memory time and switching time during operation of a single micromirror in DMD, the minimum time segment in the high bit bitplane is set as the time of 2 LSBs, which are referred to as a group. Specifically, for a display system with a bit depth of n, $2^n-1$ (odd number) LSBs can be displayed in a single frame, and the middle LSB uses the data amplitude of bitplane 0, and $2^n-2$ LSBs are remained, so $2^{n-1}-1$ groups can be displayed, in which $2^{n-2}$ groups are used to display the bitplane n-1, that is, one group in every $2^1$ groups is used to display the bitplane n-1; and $2^{n-3}$ groups of the $2^{n-1}-1$ groups are used to display the bitplane n-2, that is, one group in every $2^2$ groups is used to display the bitplane n-2; $2^0$ group is used to display the bitplane 1, that is, one group in every $2^{n-1}$ groups is used to display the bitplane 1. The second row of sequence and the third row of sequence that are shown in FIG. 2 are the optimized sequences of [01111] and [11010] based on the bit split algorithm, respectively, where the bitplane indicated by the dotted line corresponds to the "0" in the binary system, and in this case, the light modulator is in an "off" state; and the bitplane indicated by the solid line corresponds to the binary "1", and in this case the light modulator is in an "on" state.

However, the bit split algorithm optimizes the distribution of the bitplane in a case that the luminance of the light source is constant, so it is not suitable for a case where the luminance of the light source changes. In addition, the time duty cycles of different bitplanes in this bit split algorithm change in an exponential form (for example, the duration of bitplane 0 corresponds to $2^0$ LSB, and the duration of bitplane 1 corresponds to $2^1$ LSBs), and cannot be directly applied to a case where the time duty cycles of the bitplanes change in both a linear form (for example, each of bitplane 0 to bitplane i corresponds to 1 LSB) and an exponential form.

Figure 9:
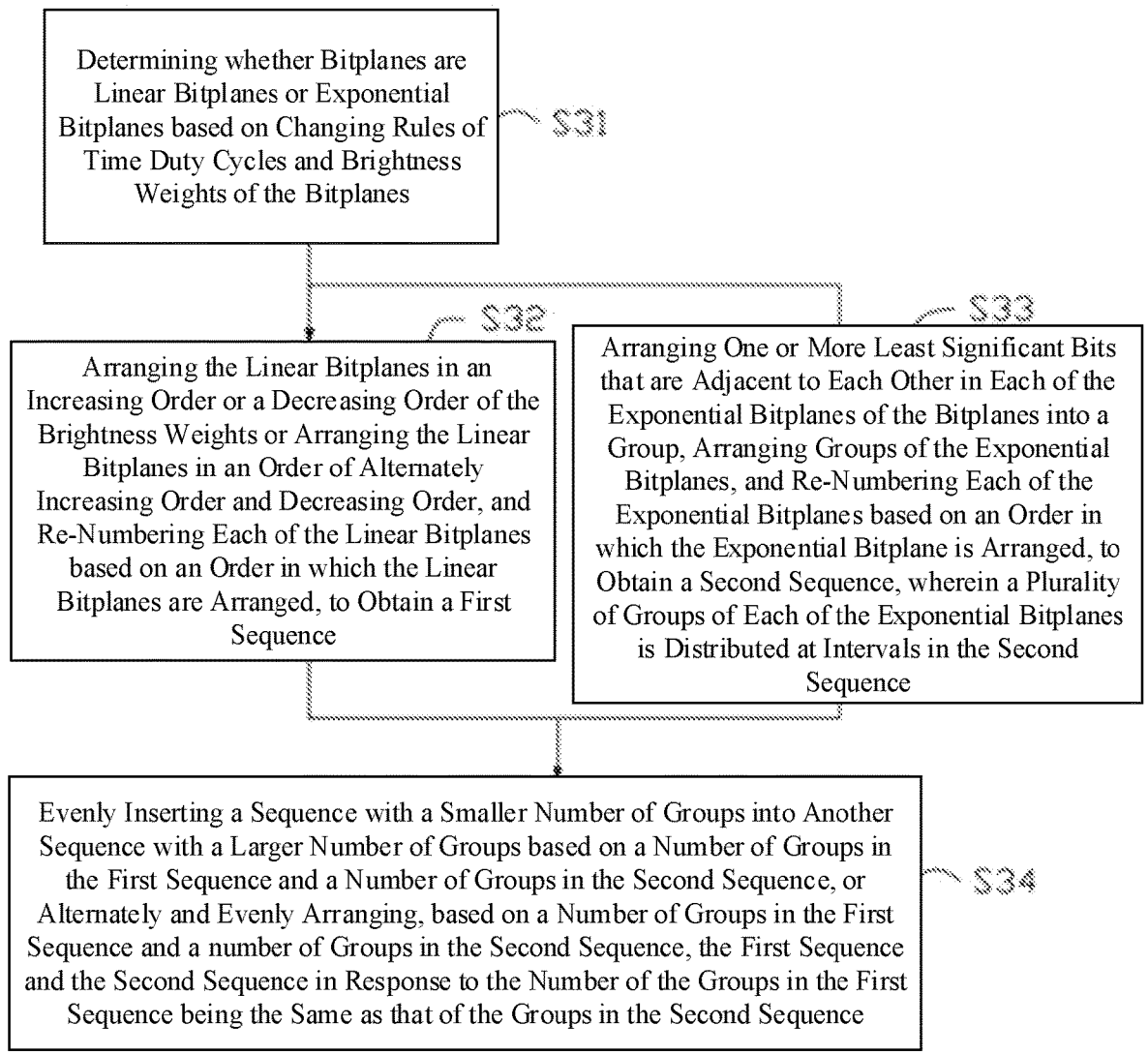
FIG. 9 is a flow chart of a modulation method for a light source and a light modulator according to the second embodiment of the present disclosure

A main difference between the display device provided by the third embodiment of the present disclosure and the display device provided by the first embodiment lies that, the arrangement sequence of the bitplanes in the first embodiment is arbitrary. In the first embodiment, an exemplary bitplane arrangement (such as FIG. 3) can cause flickering of the image observed by the human eye. Based on the display device provided by the first embodiment, the third embodiment of the present disclosure optimizes distribution of the time control of the bitplane, so that the bitplane and the corresponding display brightness within one frame time can be more evenly distributed, thereby reducing the possibility of flickering of an image observed by the human eye. Specifically, with reference to FIG. 9, the control method of the control apparatus of the display device provided by this embodiment includes the following steps.

At step S31, it is determined whether the bitplanes are linear bitplanes or exponential bitplanes based on changing rules of the time duty cycles and the brightness weights of the bitplanes, and step S31 includes: arranging all bitplanes in an increasing order of the brightness weights; arranging all bitplanes in an increasing order of the time duty cycles if the brightness weights of the bitplanes are the same, and then determining that the bitplanes are linear bitplanes if time lengths corresponding to bitplanes remain unchanged or increase by a same integer compared to adjacent bitplanes thereof, and determining the bitplanes are exponential bitplanes if the time lengths corresponding to the bitplanes increase by $2^g$ times compared to adjacent bitplanes thereof, where g is a positive integer.

For example, when the original display bit depth n of the display device is 5 and the expected increased bit depth i is 3, then the display bit depth of the grayscale image increases from 5 bits to 8 bits, and the number of the bitplanes also increases from 5 to 8. When displaying three bitplanes of the eight bitplanes, the three bitplanes each include one least significant bit, and their corresponding luminance of the laser is L, 2 L, and 4 L, respectively; and when displaying the remaining five bitplanes of the eight bitplanes, the five bitplanes respectively include 1, 2, and 4, 8, and 16 least significant bits, respectively, and their corresponding luminance of the laser is 8 L. All bitplanes are successively arranged in an increasing order of the brightness weights, then the three bitplanes are arranged in an increasing order of the luminance of the laser of L, 2 L, and 4 L; and if the brightness weights are the same, then the bitplanes are successively arranged in an increasing order of the time duty cycles of bitplanes, so the remaining five bitplanes correspond to the luminance of the laser, which is 8 L, and the bitplanes are arranged based on the number of least significant bits of the bitplanes, from less to more. The final arrangement is shown in FIG. 3.

Step S32 is performed for the linear bitplane, and step S33 is performed for the exponential bitplane.

At step S32, the linear bitplanes are re-numbered based on their arrangement order on the linear bitplanes, and all linear bitplanes are successively arranged in an increasing or decreasing order of their brightness weights, or arranged in an order of alternately increasing order and decreasing order, to obtain a first sequence.

It can be understood that if the brightness weights remain unchanged, the first sequence can be obtained by arranging all linear bitplanes in any order.

At step S33, the exponential bitplanes are re-numbered based on their arrangement order on the exponential bitplanes, and one or more least significant bits that are adjacent to each other in each exponential bitplane are regarded as a group, and the groups of all the exponential bitplanes are arranged in an order to obtain a second sequence, wherein the groups of all exponential bitplanes are distributed at intervals in the second sequence.

For example, if n bitplanes are exponential bitplanes, then m adjacent LSBs in a same exponential bitplane are regarded as a group to obtain the second sequence. In some embodiments, 1≤m≤n and m is an integer. For example, when n=4, m can be 1, 2, 3, or 4. It should be understood that the example herein is merely for illustration, and the number of LSBs in each group is not limited herein by the present disclosure.

At step S34, based on the number of groups in the first sequence and the number of groups in the second sequence, the sequence with a smaller number of groups is inserted into another sequence with a larger number of groups; or based on the number of groups in the first sequence and the number of groups in the second sequence, if the number of groups in the first sequence is the same as the number of groups in the second sequence, the first sequence and the second sequence are inserted into each other at intervals.

In this embodiment, since the number of groups in the second sequence is larger than the number of groups in the first sequence, a group in the first sequence with a smaller number of groups is inserted into the second sequence with a larger number of groups at an interval of $$\left\lfloor \frac{\text{the number of groups in the second sequence}}{\text{the number of groups in the first sequence}} \right\rfloor,$$

where $\lfloor X \rfloor$ is around-down function of the real number X. However, in some cases, for example, the number of LSBs in a certain group in the second sequence is smaller than a preset minimum time segment, then when counting the number of groups in the second sequence, the number of groups including the number of LSBs smaller than the preset minimum time segment is not used in the calculation.

For example, the increased bit depth i is 3, the original display bit depth n of the display device is 5, and the number m of LSBs in each group in the exponential bitplane (that is, the minimum time segment) is 2, then there are three linear bitplanes in this embodiment. The linear bitplanes are re-numbered based on their arrangement order on the linear bitplanes, respectively marked as (0), (1), (2), then the three linear bitplanes are arranged in an increasing order of their brightness weights to form a first sequence. In other embodiments, all linear bitplanes can also be arranged in a decreasing order of their brightness weights or arranged in an alternate increasing and decreasing order of the brightness weights. In an embodiment, if multiple linear bitplanes correspond to a same brightness weight, then the multiple linear bitplanes in the first sequence can be arranged in any order.

In this embodiment, there are five exponential bitplanes, and the exponential bitplanes are re-numbered based on their arrangement order on the exponential bitplanes, respectively marked as 0, 1, 2, 3, and 4 to form a second sequence; and each group on the exponential bitplane includes two adjacent LSBs.

Figure 10:
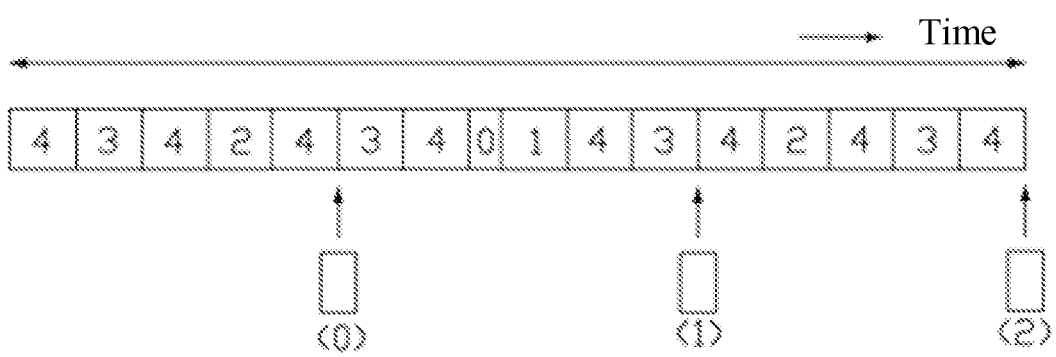
FIG. 10 is a schematic diagram illustrating a principle of time control of a display device within one frame image time according to a third embodiment of the present disclosure.

With reference to FIG. 10, among the five exponential bitplanes, the bitplane 0 includes one LSB, which alone is regarded as a group; the bitplane 1 includes two LSBs, which are regarded as a group and adjacent to the group in the bitplane 0; and the bitplane 2 includes four LSBs, which form two groups. A group formed by the bitplane 0 and the bitplane 1, as a whole, is inserted between the two groups in the bitplane 2, thereby forming a sequence including three groups (the bitplane 0 and the bitplane 1 are regarded as one group). The bitplane 3 includes eight LSBs, which form four groups, and three groups formed by combining the bitplane 2, the bitplane 1, and the bitplane 0 are respectively inserted at intervals to three intervals between four groups in the bitplane 3, thereby forming a sequence including seven groups. The bitplane 4 includes sixteen LSBs, which form eight groups, and seven groups formed by combining the bitplane 0 to the bitplane 3 are respectively inserted at intervals to seven intervals between the eight groups in the bitplane 4, thereby forming a second sequence including fifteen groups. If it can be regarded that the bitplane 0 and the bitplane 1 are split to two groups, the second sequence includes sixteen groups of LSBs.

Since the number of groups in the second sequence is greater than the number of groups in the first sequence, the first sequence is evenly inserted into the second sequence, where based on the arrangement order of the linear bitplanes, a linear bitplane is inserted into the second sequence with an interval of $$\left\lfloor \frac{15}{3} \right\rfloor = 5$$

groups. In the calculation, the bitplane 0 includes only one group, and the one group includes only one LSB, which is smaller than the preset minimum time segment, so it is not included in the number of groups in the second sequence in the calculating, and when the first sequence is inserted into the second sequence, the bitplane 0 is not regarded as a group. It should be understood that the above method is not the only arrangement of linear bitplanes and exponential bitplanes. The arrangement mainly considers that exponential bitplanes shall be evenly distributed in time, and the exponential bitplanes and linear bitplanes shall be evenly distributed in time. In another embodiment, the linear bitplanes (0), (1), and (2) respectively move forward by five groups in the second sequence for insertion (the bitplane 0 and the bitplane 1 are regarded as one group).

Fourth Embodiment

A main difference between the display device provided by the fourth embodiment of the present disclosure and the display device provided by the third embodiment of the present disclosure lies in that, the exponential bitplane includes more least significant bits in the fourth embodiment of the present disclosure, so the total number of groups is reduced, and the number of loadings is also reduced.

In this embodiment, the increased bit depth i is 3, the display bit depth n before the increase is 5, and the number m of LSBs (minimum time segment) in each group in the exponential bitplane is 4, then there are three linear bitplanes in this embodiment, respectively marked as (0), (1), and (2), which form a first sequence. In this embodiment, there are five exponential bitplanes, respectively marked as 0, 1, 2, 3, and 4, which form a second sequence. Four adjacent LSBs in the exponential bitplane are regarded as a group.

Figure 11:
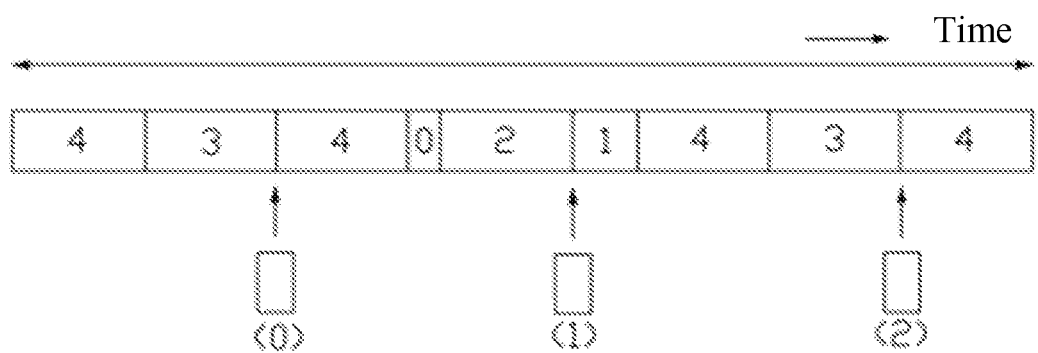
FIG. 11 is a schematic diagram illustrating a principle of time control of a display device within one frame image time according to a fourth embodiment of the present disclosure.

With further reference to FIG. 11, the three linear bitplanes (0), (1), and (2) are arranged in an increasing order. Among the five exponential bitplanes, the bitplane 0 includes one LSB, which alone forms a group and is arranged at middle of the sequence; and the bitplane 1 includes two LSBs, which form a group. Considering the time required for the memory load process, a group in another exponential bitplane is arranged between the bitplane 0 and the bitplane 1 to separate the two from each other. The bitplane 2 includes four LSBs, which form a group, and a group corresponding to the bitplane 2 can be inserted between the bitplane 0 and the bitplane 1; the bitplane 3 includes two groups, and a sequence defined by the bitplane 0 to the bitplane 2, as a whole, is inserted between the two groups of the bitplane 3, thereby forming a sequence including three groups (the groups corresponding to the bitplane 0 to the bitplane 2 are regarded as one group); and the bitplane 4 includes four groups, and the three groups corresponding to the bitplane 0 to the bitplane 3 can be inserted at intervals into three intervals between the four groups in the bitplane 4, respectively, thereby obtaining the second sequence. When regarding each of the bitplane 0 and the bitplane 1 as one group and regarding the bitplane 2 as two groups, then the second sequence includes 9 groups of LSBs. Since the number of groups in the second sequence is greater than the number of groups in the first sequence, the first sequence is evenly inserted into the second sequence, and a group in the first sequence is inserted into the second sequence with an interval of $$\left\lfloor \frac{7}{3} \right\rfloor = 2$$

groups based on the arrangement order of the groups in the first sequence, i.e., corresponding to one linear bitplane. The bitplane 0 includes only one group and the only one group includes only one LSB, which is smaller than the preset minimum time segment, similarly, the bitplane 1 includes only one group and the one group includes only two LSBs, which is smaller than the preset minimum time segment, therefore, it is not included in the number of groups in the second sequence in the calculation. During the insertion, the group in the bitplane 0 and the group in the bitplane 1 in the second sequence are not regarded as one group. It should be understood that the above method is not the only arrangement of linear bitplanes and exponential bitplanes. The arrangement mainly considers that the exponential bitplanes shall be evenly distributed in time, and the exponential bitplanes and the linear bitplanes shall be evenly distributed in time.

Fifth Embodiment

A main difference between the display device provided by the fifth embodiment of the present disclosure and the display device provided by the third embodiment lies in that, the number of LSBs (i.e., the minimum time segment) in each group in the exponential bitplane is an odd number, and since each exponential bitplane generally includes $2^n$ LSBs (n is a positive integer), the number of LSBs in each exponential bitplane can be not evenly divisible by the minimum time segment m.

In this embodiment, the increased bit depth i is 3, the original display bit depth n is 5, and the number m of LSBs (minimum time segment) in each group in the exponential bitplane is 3, then there are three linear bitplanes, which are respectively marked as (0), (1), and (2) and form the first sequence. In this embodiment, there are five exponential bitplanes, respectively marked as 0, 1, 2, 3, and 4, which form the second sequence. Each exponential bitplane includes three adjacent LSBs.

Figure 12A:
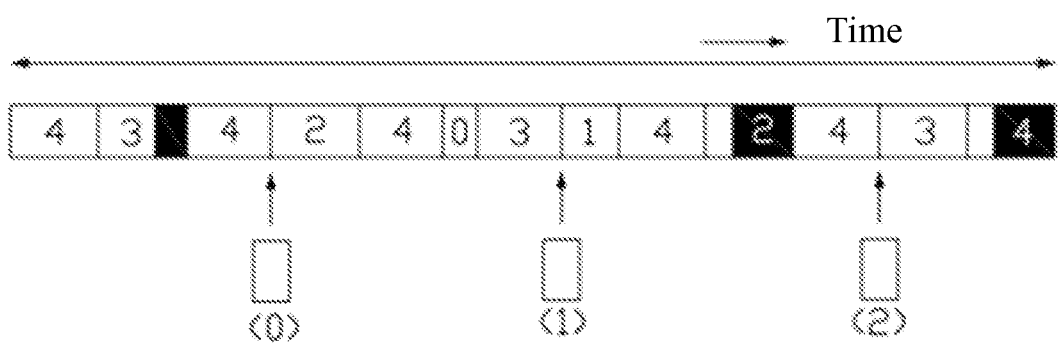
FIG. 12a and FIG. 12b are schematic diagrams illustrating a principle of time control of a display device within one frame image time according to a fifth embodiment of the present disclosure.
Figure 12B:
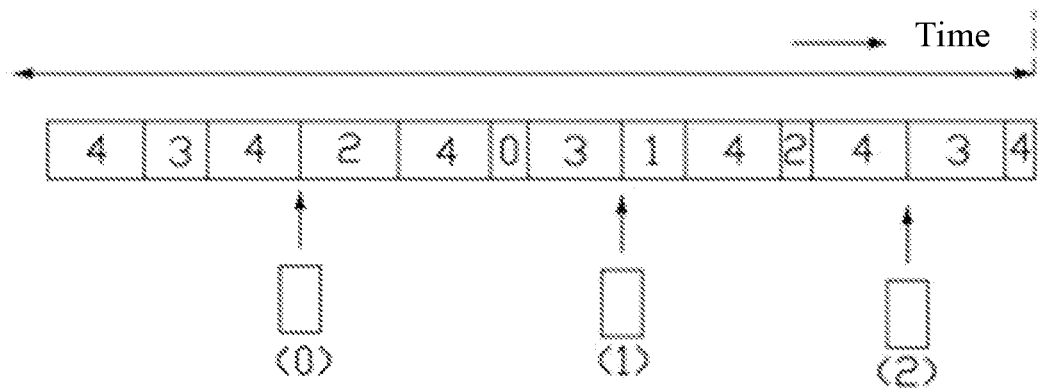

With reference to FIG. 12a and FIG. 12b the three linear bitplanes (0), (1), and (2) are arranged in an increasing order. Among the five exponential bitplanes, the bitplane 0 includes one LSB, which is arranged at middle of the second sequence; the bitplane 1 includes two LSBs, which form a group, and considering the time required for the memory load process, it is separated from the memory load of the bitplane 0; and a group in another exponential bitplane is arranged between the bitplane 0 and the bitplane 1 to separate the two from each other.

When the number of least significant bits in an exponential bitplane is not an integer multiple of the minimum time segment, a supplementary least significant bit is added to the exponential bitplane to make the number of least significant bits in the exponential bitplane be an integer multiple of the minimum time segment.

In addition, the bitplanes 2, 3, and 4 respectively include 4, 8, and 16 LSBs, each of which is not divisible by 3. Therefore, two supplementary LSBs can be added to the bitplane 2 to make the number of LSBs in the bitplane 2 two times the minimum time segment (i.e., 3); one supplementary LSB can be added to the bitplane 3 to make the number of LSBs in the bitplane 3 three times the minimum time segment (i.e., 3); and two supplementary LSBs can be added to the bitplane 4 to make the number of LSBs in the bitplane 4 six times the minimum time segment (i.e., 3). In other words, for each bitplane, two or one LSB needs to be supplemented so that the number of LSBs in each bitplane is an integer multiple of 3. After that, the bitplane 0 to the bitplane 4 can be arranged in the same manner as in the third embodiment to obtain the second sequence.

There are two solutions for the supplementary LSB.

One of the two solutions is that, the light modulator corresponding to the supplementary least significant bit is set to an "off" state. Specifically, the supplementary LSB corresponds to a clear operation of the DMD, that is, each of the micromirrors is set to an "off" state, so that the supplementary LSB always corresponds to a dark state in its time sequence. Therefore, the supplementary LSB is represented by a black color in FIG. 12a.

Since there can be multiple groups in a bitplane, how to distribute the supplementary LSBs between different groups and in a single group, and how to arrange the groups need to be further designed. For all groups including the supplementary least significant bit, the supplementary least significant bit in each group is arranged at a same end (for example, tail end) of the group. If the bitplane with a group including the supplementary least significant bit is marked as an odd number, the group including the supplementary least significant bit is arranged at one end (for example, head end) of the bitplane; and if the bitplane with a group including the supplementary least significant bit is marked as an even number, the group including the supplementary least significant bit is arranged at the other end (for example, tail end) of the bitplane. Such a design is beneficial to avoid to perform clear operations on two adjacent groups.

The other one of the two solutions is that, a sequence with a smaller number of groups is evenly inserted into another sequence with a larger number of groups, and all supplementary least significant bits are deleted, thereby obtaining a third sequence, as shown in FIG. 12b. In other words, the supplementary LSB has no corresponding light modulation process. Such design is beneficial to avoid the increase in the display time of one frame image due to the increase in the number of LSBs required in a single frame after the supplementary LSB is introduced, and it is also beneficial to avoid decrease in the maximum average display brightness within a frame time.

Sixth Embodiment

A main difference between the display device provided by the sixth embodiment of the present disclosure and the display device provided by third embodiment lies in that, when the number of linear bitplanes is equal to the number of exponential bitplanes, based on a principle of uniformity, the first sequence and the second sequence can be alternately and evenly distributed to meet the requirement.

Figure 13:
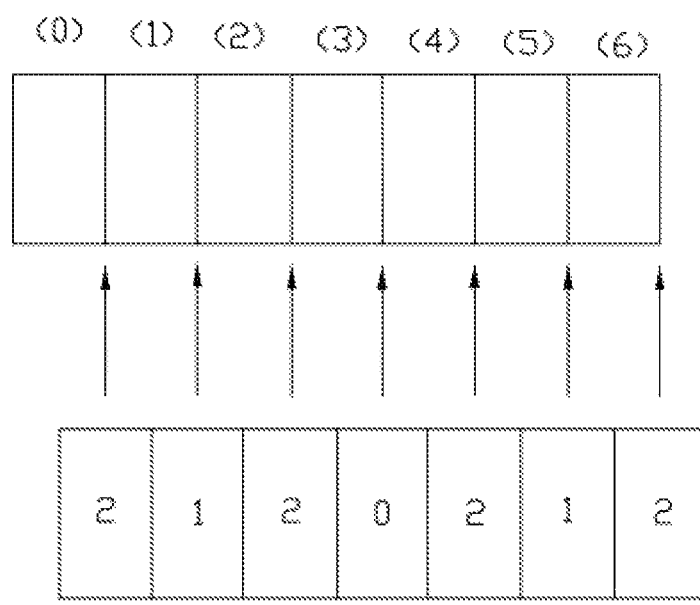
FIG. 13 is a schematic diagram illustrating a principle of time control of a display device within one frame image time according to a sixth embodiment of the present disclosure.

Specifically, with reference to FIG. 13, in this embodiment, the increased bit depth i is 7, the display bit depth n before the increase is 3, and the number m of LSBs in each group in the exponential bitplane is 1, then there are seven linear bitplanes in this embodiment, marked as (0), (1), (2), (3), (4), (5), and (6), which form the first sequence. In this embodiment, there are three exponential bitplanes, respectively marked as 0, 1, and 2, which form the second sequence. Since m=1, each LSB in the exponential bitplane independently forms a group, or in other words, there is no group operation. In this case, the number of linear bitplanes is the same as the number of exponential bitplanes. Based on a principle of uniformity, the first sequence and the second sequence can be alternately and evenly distributed to meet the requirement.

Seventh Embodiment

A main difference between the display device provided by the seventh embodiment of the present disclosure and the display device provided by the second embodiment lies in that, on the basis of the second embodiment, when two luminance each adopt a design of the exponential bitplane, each of the first sequence and the second sequence is divided and arranged based on the bitplanes and then inserted to each other at interval.

Figure 14:
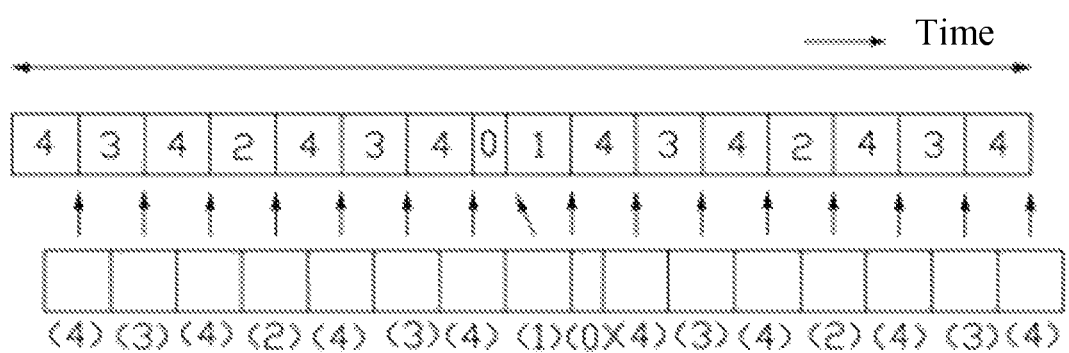
FIG. 14 is a schematic diagram illustrating a principle of time control of a display device within one frame image time according to a seventh embodiment of the present disclosure.

With reference to FIG. 14, in this embodiment, the increased bit depth i is 5, the display bit depth n before the increase is 5, and the number m of LSBs in each group in the exponential bitplane is 2. In this embodiment, the display bit depth with luminance of $2^i L$ is 5, i.e., including five bitplanes, which are marked as bitplanes 0, 1, 2, 3, and 4, and there are thirty-one LSBs in total, therefore, combination and arrangement can be made based on a conventional bit split method, as shown in FIG. 14; similarly, the display bit depth with luminance of L is 5, i.e., including five bitplanes, which are marked as bitplanes (0), (1), (2), (3), and (4), and there are thirty-one LSBs in total, therefore, combination and arrangement can be made based on a conventional bit split method, and a slight difference thereof is that the bitplane (0) corresponding to a single LSB is arranged at a position behind the middle position, and a single LSB corresponding to the bitplane 0 is arranged at a position before the middle position. This step is due to the consideration that when m=2, the time required to load the memory on a single group can exceed the time of a single LSB, so a "clear" operation is required, and if the linear bitplane 0 and the exponential bitplane 0 are adjacent to each other, the micromirror will be mostly in an "off" state at local time. After the first sequence and the second sequence are obtained, the first sequence and the second sequence can be alternately and evenly arranged to achieve uniform brightness.

In the present disclosure, based on the rapid time response characteristic of the laser, the peak brightness of the display device is increased by means of the current overdrive pulse. In this way, the time required for bit depth modulation be decreased to within the time of less LSBs by controlling the driving current of the laser in the current overdrive pulse state, and the current overdrive pulse can be used to avoid the decrease of the average brightness of the image while increasing the display bit depth in the conventional technology. It should be noted that in the present disclosure, the time response requirement on the light modulator is reduced by regulating the driving current of the laser in the current overdrive pulse state and combining multiple LSBs, and the current is regulated within the time corresponding to each LSB. Since the pulse modulation time of the laser is relatively fast, which can be greater than 100 kHz or even higher, currently there is no restriction on the time response of the light modulator, so a high frame rate can be achieved.

The display device provided by the present disclosure also comprehensively considers the bit depth, the brightness, and the service life, and increases the display bit depth; the display device provided by the present disclosure also optimizes the time control of the bitplane, so that the bitplane and its corresponding display brightness are more evenly distributed, which is beneficial to avoid flickering in the display.

For those skilled in the art, it is obvious that the present disclosure is not limited to the details of the exemplary embodiments described above, and the present disclosure can be implemented in other specific forms without departing from the spirit or basic features of the present disclosure. Therefore, from any point of view, the embodiments shall be regarded as exemplary and non-limiting, and the scope of the present disclosure is defined by the appended claims rather than the above description, therefore, all changes falling within the meaning and scope of equivalent elements of the claims are included in the present disclosure. Any reference sign in the claims shall not be regarded as limiting the claims. In addition, it is obvious that the word "including/include" does not exclude other units or steps, and the singular form does not exclude the plural form. Multiple devices stated in a device claim can also be implemented by a same device or system through software or hardware. Words such as "first" and "second" are intended to denote names, and not intended to denote any specific order.

Finally, it should be noted that the embodiments described above are merely used to illustrate the technical solutions of the present disclosure and not to limit thereto. Although the present disclosure has been described in details with reference to some embodiments, those skilled in the art should understand that the technical solutions of the present disclosure can be modified or equivalently replaced without departing from the spirit and scope of the technical solutions of the present disclosure.

What is claimed is:

1. A display device, comprising:
   a light source;
   a light modulator, wherein the light modulator comprises a digital micromirror array comprising a plurality of micromirrors, and is arranged on a light path of light emitted by the light source and configured to modulate the light emitted by the light source based on a target image and luminance of the light source to obtain a grayscale image; and
   a control apparatus, wherein the control apparatus is configured to control a driving current of the light source to adjust the luminance of the light source in different periods within a frame image, and to cause a driving current overdrive pulse of the light source during at least one of the periods, so that a display bit depth of the grayscale image increases from n to n+i and the periods correspond to bitplanes of the grayscale image in one-to-one correspondence, where n denotes an original display bit depth of the display device, i≥1 and i is an integer.

2. The display device according to claim 1, wherein said modulating the light emitted by the light source based on the target image and the luminance of the light source comprises:
   when displaying each of n+i bitplanes, matching a modulation duration of the light modulator with a number of least significant bits comprised in the bitplane, wherein the grayscale image comprises the n+i bitplanes.

3. The display device according to claim 2, wherein said adjusting the luminance of the light source in different periods within the frame image, and causing the driving current overdrive pulse of the light source during the at least one of the periods comprise:
   when displaying i bitplanes of the n+i bitplanes, setting each of the i bitplanes to include only one least significant bit, and adjusting the driving current of the light source to match the luminance of the light source with i values of k in a set $\{k|k=2^jL, 0\le j\le i-1, j\ \varepsilon\ Z\}$ in one-to-one correspondence, where L denotes a preset brightness parameter; and
   when displaying the remaining n bitplanes of the n+i bitplanes, matching numbers of least significant bits comprised in the remaining n bitplanes with n values of m in a set $\{m|m=2^{j-i}, i\le j\le n+i-1, j\ \varepsilon\ Z\}$ in one-to-one correspondence, and adjusting the driving current of the light source to make the luminance of the light source be $2^iL$.

4. The display device according to claim 2, wherein said adjusting the luminance of the light source in different periods within the frame image, and causing the driving current overdrive pulse of the light source during the at least one of the periods comprise:
   when displaying i bitplanes of the n+i bitplanes, corresponding numbers of least significant bits comprised in the i bitplanes to i values of x in a set $\{x|x=2^j, 0\le j\le i-1, j\ \varepsilon\ Z\}$ in one-to-one correspondence, and adjusting the driving current of the light source to make the luminance of the light source be L, where L denotes a preset brightness parameter; and
   when displaying the remaining n bitplanes of the n+i bitplanes, matching numbers of least significant bits comprised in the remaining n bitplanes with n values of y in a set $\{y|y=2^{j-i}, i\le j\le n+i-1, j\ \varepsilon\ Z\}$ in one-to-one correspondence, and adjusting the driving current of the light source to make the luminance of the light source be $2^iL$.

5. The display device according to claim 1, wherein the control apparatus is further configured to determine whether an increased bit depth meets a preset service life of the light source, and
   wherein determining whether the increased bit depth meets the preset service life of the light source comprises:
   assigning an initial value to the increased bit depth;
   calculating an aging acceleration factor of the light source in a current overdrive pulse state based on the increased bit depth, a rated current of the light source, a rated output power of the light source, and a working temperature of the light source in a continuous rated current driving state;
   calculating, based on an initial bit depth and the increased bit depth of the display device, a time duty cycle when the luminance of the light source is $2^iL$;
   calculating a statistical service life of the light source in the current overdrive pulse based on a statistical service life of the light source in the continuous rated current driving state, the aging acceleration factor and the time duty cycle; and
   determining whether the statistical service life of the light source in the current overdrive pulse is longer than or equal to a preset service life threshold; in accordance with a determination that the statistical service life of the light source in the current overdrive pulse state is longer than or equal to the preset service life threshold, outputting a current increased bit depth; and in accordance with a determination that the statistical service life of the light source in the current overdrive pulse state is shorter than the preset service life threshold, reducing the increased bit depth by one.

6. The display device according to claim 5, wherein said calculating the aging acceleration factor of the light source in the current overdrive pulse state based on the increased bit depth, the rated current of the light source, the rated output power of the light source, and the working temperature of the light source in the continuous rated current driving state comprises:
   calculating an power acceleration factor based on the increased bit depth and the rated output power of the light source;
   calculating a current acceleration factor based on the rated current of the light source and a driving current of the light source in the current overdrive pulse state;
   obtaining a temperature acceleration factor based on the working temperature of the light source in the continuous rated current driving state and a working temperature of the light source in the current overdrive pulse state; and
   obtaining the aging acceleration factor based on the power acceleration factor, the current acceleration factor, and the temperature acceleration factor.

7. The display device according to claim 1, wherein the control apparatus is further configured to arrange the bitplanes of the grayscale image, and
   wherein arranging the bitplanes of the grayscale image includes:
   determining whether the bitplanes are linear bitplanes or exponential bitplanes based on changing rules of time duty cycles and brightness weights of the bitplanes;

arranging the linear bitplanes in an increasing order or a decreasing order of the brightness weights or arranging the linear bitplanes in an order of alternately increasing order and decreasing order, and re-numbering each of the linear bitplanes based on an order in which the linear bitplanes are arranged, to obtain a first sequence;

arranging one or more least significant bits that are adjacent to each other in each of the exponential bitplanes of the bitplanes into a group, arranging groups of the exponential bitplanes, and re-numbering each of the exponential bitplanes based on an order in which the exponential bitplane is arranged, to obtain a second sequence, wherein a plurality of groups of each of the exponential bitplanes is distributed at intervals in the second sequence; and evenly inserting a sequence with a smaller number of groups into another sequence with a larger number of groups based on a number of groups in the first sequence and a number of groups in the second sequence, or alternately and evenly arranging the first sequence and the second sequence in response to the number of the groups in the first sequence being the same as that of the groups in the second sequence.

8. The display device according to claim 7, wherein said determining whether the bitplanes are the linear bitplanes or the exponential bitplanes based on the changing rules of the time duty cycles and the brightness weights of the bitplanes comprises:

arranging the bitplanes in an increasing order of the brightness weights; and if the brightness weights are the same, arranging the bitplanes in an increasing order of time the time duty cycles of the bitplanes; if time lengths corresponding to the bitplanes remain unchanged or increase by a same integer compared to their adjacent bitplanes, determining that the bitplanes are the linear bitplane, and if time lengths corresponding to the bitplanes increase by $2^g$ times compared to adjacent bitplanes thereof, where g is a positive integer, determining that the bitplanes are the exponential bitplanes.

9. The display device according to claim 8, wherein said arranging the one or more least significant bits that are adjacent to each other in each of the exponential bitplanes of the bitplanes into the group comprises:

if a number of the one or more least significant bits in one exponential bitplane of the exponential bitplanes is not an integral multiple of a minimum time segment, adding at least one supplementary least significant bit to the one exponential bitplane in such a manner that the number of the one or more least significant bits in the one exponential bitplane is an integral multiple of the minimum time segment.

10. The display device according to claim 9, wherein the display device is further configured to delete the at least one supplementary least significant bit to obtain a third sequence in response to said evenly inserting the sequence with the smaller number of groups into another sequence with the larger number of groups based on the number of groups in the first sequence and the number of groups in the second sequence, or alternately and evenly arranging, based on the number of groups in the first sequence and the number of groups in the second sequence, the first sequence and the second sequence in response to the number of the groups in the first sequence being the same as the number of the groups in the second sequence.

11. The display device according to claim 10, wherein the display device is further configured to:

for groups each comprising the at least one supplementary least significant bit, arrange the at least one supplementary least significant bit at a same end of the groups each comprising the at least one supplementary least significant bit; and if one of the bitplanes with a group comprising the at least one supplementary least significant bit is numbered as an odd number, arrange the group comprising the at least one supplementary least significant bit at an end of the bitplane; and if another one of the bitplanes with a group comprising the at least one supplementary least significant bit is numbered as an even number, arrange the group comprising the at least one supplementary least significant bit at another end of the another bitplane.

12. The display device according to claim 9, wherein the light modulator corresponding to the at least one supplementary least significant bit is set to be in an "off" state.

13. The display device according to claim 12, wherein the display device is further configured to:

for groups each comprising the at least one supplementary least significant bit, arrange the at least one supplementary least significant bit at a same end of the groups each comprising the at least one supplementary least significant bit; and if one of the bitplanes with a group comprising the at least one supplementary least significant bit is numbered as an odd number, arrange the group comprising the at least one supplementary least significant bit at an end of the bitplane; and if another one of the bitplanes with a group comprising the at least one supplementary least significant bit is numbered as an even number, arrange the group comprising the at least one supplementary least significant bit at another end of the another bitplane.

14. The display device according to claim 9, wherein the display device is further configured to:

for groups each comprising the at least one supplementary least significant bit, arrange the at least one supplementary least significant bit at a same end of the groups each comprising the at least one supplementary least significant bit; and if one of the bitplanes with a group comprising the at least one supplementary least significant bit is numbered as an odd number, arrange the group comprising the at least one supplementary least significant bit at an end of the bitplane; and if another one of the bitplanes with a group comprising the at least one supplementary least significant bit is numbered as an even number, arrange the group comprising the at least one supplementary least significant bit at another end of the another bitplane.

\* \* \* \* \*